(12) United States Patent
Franke

(10) Patent No.: US 12,731,842 B2
(45) Date of Patent: Sep. 8, 2026

(54) ELECTRICAL ENERGY STORE HAVING A LATERAL CELL CONTACT SYSTEM, AND MOTOR VEHICLE

(71) Applicant: Bayerische Motoren Werke Aktiengesellschaft, Munich (DE)

(72) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 615 days.

(21) Appl. No.: 18/270,555

(22) PCT Filed: Mar. 8, 2022

(86) PCT No.: PCT/EP2022/055869
§ 371 (c)(1),
(2) Date: Jun. 30, 2023

(87) PCT Pub. No.: WO2022/214259
PCT Pub. Date: Oct. 13, 2022

(65) Prior Publication Data

US 2024/0063485 A1 Feb. 22, 2024

(30) Foreign Application Priority Data

Apr. 7, 2021 (DE) ..................... 10 2021 108 570.5

(51) Int. Cl.
*H01M 50/213* (2021.01)
*H01M 50/249* (2021.01)
(Continued)

(52) U.S. Cl.
CPC ....... *H01M 50/213* (2021.01); *H01M 50/249* (2021.01); *H01M 50/502* (2021.01); *H01M 50/55* (2021.01); *H01M 50/559* (2021.01)

(58) Field of Classification Search
CPC ............. H01M 50/213; H01M 50/249; H01M 50/559; H01M 50/502; H01M 50/55
(Continued)

(56) References Cited

U.S. PATENT DOCUMENTS

2002/0006544 A1 1/2002 Asaka et al.
2012/0015235 A1 1/2012 Fuhr et al.
(Continued)

FOREIGN PATENT DOCUMENTS

CN 104471748 A 3/2015
CN 104662710 A 5/2015
(Continued)

OTHER PUBLICATIONS

International Search Report (PCT/ISA/210) issued in PCT Application No. PCT/EP2022/055869 dated Jun. 24, 2022 with English translation (4 pages).
(Continued)

*Primary Examiner* — James M Erwin
(74) *Attorney, Agent, or Firm* — Crowell & Moring LLP

(57) ABSTRACT

An electrical energy store has a plurality of energy storage cells each having a cell housing and two cell terminals, and a cell contact system for connecting the energy storage cells which has a carrier and conductor tracks which are connected to the carrier and have conductor track portions forming contact regions for contacting the cell terminals of the energy storage cells. The cell terminals have terminal regions which are to be at least partially laterally contacted, and the contact regions are at least partially in the form of lateral pressure contacts which, during contact, exert a lateral force on the terminal regions which are to be laterally contacted.

9 Claims, 3 Drawing Sheets

(51) Int. Cl.

| | |
|---|---|
| ***H01M 50/502*** | (2021.01) |
| ***H01M 50/55*** | (2021.01) |
| ***H01M 50/559*** | (2021.01) |

(58) Field of Classification Search

USPC .......................................................... 429/149

See application file for complete search history.

(56) References Cited

U.S. PATENT DOCUMENTS

| | | | | |
|---|---|---|---|---|
| 2015/0155533 | A1 | 6/2015 | Kim et al. | |
| 2015/0228959 | A1 | 8/2015 | Minagata et al. | |
| 2018/0205048 | A1 * | 7/2018 | Enomoto ............ | H01M 50/503 |
| 2020/0313139 | A1 * | 10/2020 | Patterson ............ | H01M 50/581 |
| 2021/0265750 | A1 * | 8/2021 | Rieder ................. | H01R 11/288 |
| 2021/0351523 | A1 * | 11/2021 | Dawson .............. | H01M 50/502 |

FOREIGN PATENT DOCUMENTS

| | | | | |
|---|---|---|---|---|
| CN | 105514498 | A | 4/2016 | |
| CN | 205828469 | U | 12/2016 | |
| DE | 19648353 | A1 * | 5/1998 | ............ H01M 50/24 |
| DE | 101 22 682 | A1 | 11/2001 | |
| DE | 10 2018 203 108 | A1 | 9/2019 | |
| EP | 2 631 964 | A1 | 8/2013 | |
| EP | 3 159 952 | A1 | 4/2017 | |
| JP | 2010-157399 | A | 7/2010 | |
| JP | 2017-69072 | A | 4/2017 | |
| WO | WO 2011/111722 | A1 | 9/2011 | |
| WO | WO 2014/123021 | A1 | 8/2014 | |
| WO | WO 2019/224351 | A1 | 11/2019 | |

OTHER PUBLICATIONS

German-language Written Opinion (PCT/ISA/237) issued in PCT Application No. PCT/EP2022/055869 dated Jun. 24, 2022 (6 pages).

German-language Search Report issued in German Application No. 10 2021 108 570.5 dated Dec. 1, 2021 with partial English translation (11 pages).

English translation of Chinese-language Office Action issued in Chinese Application No. 202280008589.2 dated Mar. 30, 2026 (11 pages).

* cited by examiner

ELECTRICAL ENERGY STORE HAVING A LATERAL CELL CONTACT SYSTEM, AND MOTOR VEHICLE

BACKGROUND AND SUMMARY OF THE INVENTION

The invention relates to an electrical energy store having a plurality of energy storage cells, each having a cell housing and two cell terminals. Moreover, the electrical energy store comprises a cell contact-connection system for interconnecting the energy storage cells, which has a support and conductor tracks that are connected to the support and have conductor track portions. The conductor track portions form contact regions for contact-connection to the cell terminals of the energy storage cells. The invention moreover relates to a motor vehicle.

In the present case, interest is directed to electrical energy stores which can be used, for example, as traction batteries for electrified motor vehicles, that is to say electric or hybrid vehicles. Such electrical energy stores usually have a cell assembly of multiple energy storage cells and a cell contact-connection system for interconnecting the energy storage cells. The cell contact-connection system is usually disposed on one side of the cell assembly, for example on an upper side of the cell assembly on which there are cell terminals of the energy storage cells. The cell contact-connection system generally comprises cell connectors which are inserted individually into an electrically insulating support in the form of sheet-metal parts. These sheet-metal parts are contact-connected to cell terminals of the energy storage cells via bond wires. A disadvantage of such a cell contact-connection system is the high manufacturing outlay for the production of the bond connections between the cell connectors and the cell terminals.

An object of the present invention is to provide an alternative solution for how energy storage cells of an electrical energy store can be contact-connected.

This object is achieved by an electrical energy store and a motor vehicle having the features according to claimed invention.

An electrical energy store according to embodiments of the invention has a plurality of energy storage cells, each having a cell housing and two cell terminals. Moreover, the electrical energy store comprises a cell contact-connection system for interconnecting the energy storage cells, which has a support and conductor tracks that are connected to the support and have conductor track portions. The conductor track portions form contact regions for contact-connection to the cell terminals of the energy storage cells. The cell terminals at least partially have terminal regions that are to be contact-connected laterally. The contact regions are at least partially in the form of lateral pressure contacts which in the course of the contact-connection exert a lateral force on the terminal regions that are to be contact-connected laterally.

The electrical energy store may, for example, be a high-voltage energy store, which is used as rechargeable traction battery or as traction accumulator for an electrically operable motor vehicle. The electrical energy store has at least one cell assembly, which comprises multiple energy storage cells. The energy storage cells may, for example, be in the form of prismatic energy storage cells or pouch cells. The energy storage cells are preferably in the form of round cells. The energy storage cells have cell terminals, or cell poles, which are disposed on the cell housing of the energy storage cells. The cell housing in particular has a cell housing cover, a cell housing side wall and a cell housing bottom. In the case of round cells, the cell housing cover and the cell housing bottom are circular and the cell housing side wall is hollow-cylindrical. In this respect, it can be provided that a first cell terminal, for example a positive pole, is disposed on the cell housing cover of the cell housing of the energy storage cells and a second cell terminal, for example a negative pole, is disposed on the cell housing side wall of the cell housing.

Moreover, the electrical energy store has a cell contact-connection system for electrically connecting the energy storage cells in a predetermined interconnection pattern. The cell contact-connection system comprises conductor tracks, which are disposed in a predetermined conductor track pattern, or conductor track layout. The conductor tracks have conductor track portions which form the contact regions for contact-connection to the cell terminals. The contact regions are disposed in cutouts in the support of the cell contact-connection system, in which cutouts the energy storage cells are also disposed. The contact-connection regions are designed for lateral contact-connection of the energy storage cells by pressing the contact regions laterally against the terminal regions of the cell terminals. The connection between the contact regions and the terminal regions is thus established by a force fit. The terminal regions are in particular oriented in such a way that they extend at least partially along a vertical axis of the energy storage cells.

The lateral contact-connection of the energy storage cells has the advantage that an upper side of the cell assembly is not covered by the cell contact-connection system and thus can be disposed on a cooling device for cooling the energy storage cells. Moreover, the electrical connection between the cell terminals and the contact regions has a low contact resistance owing to the contact force provided by the pressure contact.

Particularly preferably, the electrical energy store has a store housing with a housing upper part and a housing lower part, wherein the housing upper part and the housing lower part have a double-walled form to form a respective cooling channel, and wherein, to cool the energy storage cells, the housing upper part is disposed on the cell housing covers of the cell housings and the housing lower part is disposed on the cell housing bottoms of the cell housings. The energy storage cells are thus cooled on both sides in that the housing upper part is thermally coupled to the upper side of the cell assembly and the housing lower part is thermally coupled to the lower side of the cell assembly, and they can transport away waste heat from the energy storage cells via the coolant which flows through. Inner sides of the housing parts can be coated with an insulating layer, with the result that the housing parts can rest on the cell housing of the energy storage cells.

In one embodiment of the invention, the conductor tracks are formed by a punched comb, which is joined to an insulating material forming the support. The conductor track pattern, or conductor track layout, is created in accordance with the predetermined desired interconnection of the energy storage cells, with the result that the contact regions can be electrically connected selectively to individual cell terminals of the energy storage cells and via conductor track portions in the form of connection regions. The cell contact-connection system may be manufactured in multiple alternating structuring and primary-forming process steps. First of all, a conductor material, for example in the form of a metal sheet, is provided. In a first step, cutouts are made, in particular by punching, in this conductor material in order to form the punched comb, or leadframe. In this respect, the cutouts are selected such that remaining conductor material regions are mechanically but also electrically connected, with the result that the conductor material is in one piece as before. These remaining conductor material regions form the first part of the conductor track pattern.

The structured conductor material is then integrated in the support. To this end, in a second step the structured conductor material is connected to the insulating material by way of joining by primary forming. The insulating material is a stabilizing, electrically insulating material, for example a plastic. In the course of primary forming, the solid support is produced with a geometrically defined shape from the shapeless insulating material. To this end, the insulating material is for example plasticized, shaped and cured. During the primary forming, the structured conductor material is embedded in the insulating material and thus mechanically connected to the insulating material. Such a connection technique in the form of joining by primary forming may for example be encapsulation of the structured conductor material with the insulating material by injection molding or potting the structured conductor material with the insulating material. In the course of primary forming, in particular the cutouts in the structured conductor material are covered at least in certain regions with the insulating material. The insulating material makes it possible to mechanically connect the remaining conductor material regions to one another. The insulating material can be applied to the structured conductor material on both sides. Moreover, surface profiles or vertical profiles for the support can be formed in the course of primary forming of the insulating material. The surface profiles can be different on the lower side and the upper side of the conductor material. This surface profile comprises for example access openings, through which the energy storage cells can be contact-connected to those conductor track portions that form the contact regions when the cell contact-connection system is being disposed on the cell assembly. Moreover, the access openings serve to provide the conductor material with further structuring in a third step. The surface profile may moreover comprise receptacles for the energy storage cells.

In this third step, further cutouts are made in the conductor material through the access openings. In particular, those regions that could not be cut out in the first step are cut out to shape or finish the conductor track pattern, since otherwise a multiple-part conductor track layout consisting of individual parts which would, however, form an undesired electrical connection between conductor material regions would be produced. After the third step, the conductor track pattern can be completely finished. However, it may also be the case that further second and third steps are performed depending on the complexity of the conductor track pattern.

It has proven to be advantageous when the cell housings each have at least one notch in which the associated contact region is disposed and which form that terminal region of the respective cell terminal that is to be contact-connected laterally. These notches, or grooves, may for example extend over the entire circumference or only part of the circumference of the cell housings. For example, a notch can extend in the circumferential direction over the hollow-cylindrical side wall and form the terminal region of the second cell terminal. The contact regions may be disposed in the notches in order to establish the connection between the terminal regions and the contact regions by a form fit in addition to the force fit.

For example, the contact regions may have a fold which is in the form of a turned-up portion and is formed by folding over an edge region of the conductor track portions, wherein the fold is pressed laterally against the respective terminal region. This fold in the form of a turned-up portion, or doubling, forms a spring-contact-like pressure contact. For example, the folds can be formed by folding over the structured metal sheet, or conductor material.

In one embodiment of the invention, the cell housing covers each have an upwardly projecting bulge, wherein a side surface of the bulge forms that terminal region of the first cell terminal that is to be contact-connected laterally. The cell housing is thus upwardly continued by the bulge along the vertical height axis, with the result that the first cell terminal is readily accessible for the lateral contact-connection. The bulge may for example have a frustoconical or cylindrical form.

It has proven to be advantageous when the lateral surfaces of the bulges have threads, and the support has mating threads corresponding to the threads for fixing the energy storage cells to the support. The energy storage cells can thus be fastened to the support by screwing the cell housings into the receptacles in the support.

In one embodiment, that terminal region of the first cell terminal that is to be contact-connected laterally is in the form of at least one first upwardly protruding press-in pin which is connected to the cell housing cover, that terminal region of the second cell terminal that is to be contact-connected laterally is in the form of at least one second upwardly protruding press-in pin which is connected to the cell housing side wall, and the associated contact regions are in the form of contact holes in the conductor tracks, in which holes the press-in pins are pressed. Such contact-connection by way of press-in pins and contact holes has high contact forces, as a result of which a contact resistance is reduced and conductivity is increased.

Also part of the invention is a motor vehicle having at least one electrical energy store according to embodiments of the invention. The motor vehicle is in particular an electrified motor vehicle and comprises the electrical energy store as traction battery. In particular, the frame of the electrical energy store is connected to the bodywork of the motor vehicle with formation of a support structure.

The embodiments presented in relation to the electrical energy store according to the invention and their advantages apply correspondingly to the embodiments of motor vehicle according to the invention.

Further features of the invention will become apparent from the claims, the figures and the description of the figures. The features and combinations of features that are mentioned in the description above and the features and combinations of features that are mentioned in the description of the figures below and/or are shown in the figures alone can be used not just in each specified combination but also in other combinations or individually.

The invention will now be explained in more detail on the basis of a preferred exemplary embodiment and with reference to the drawings.

DETAILED DESCRIPTION OF THE DRAWINGS

In the figures, elements that are the same or have the same function are provided with the same reference signs.

Figures 1, 2:
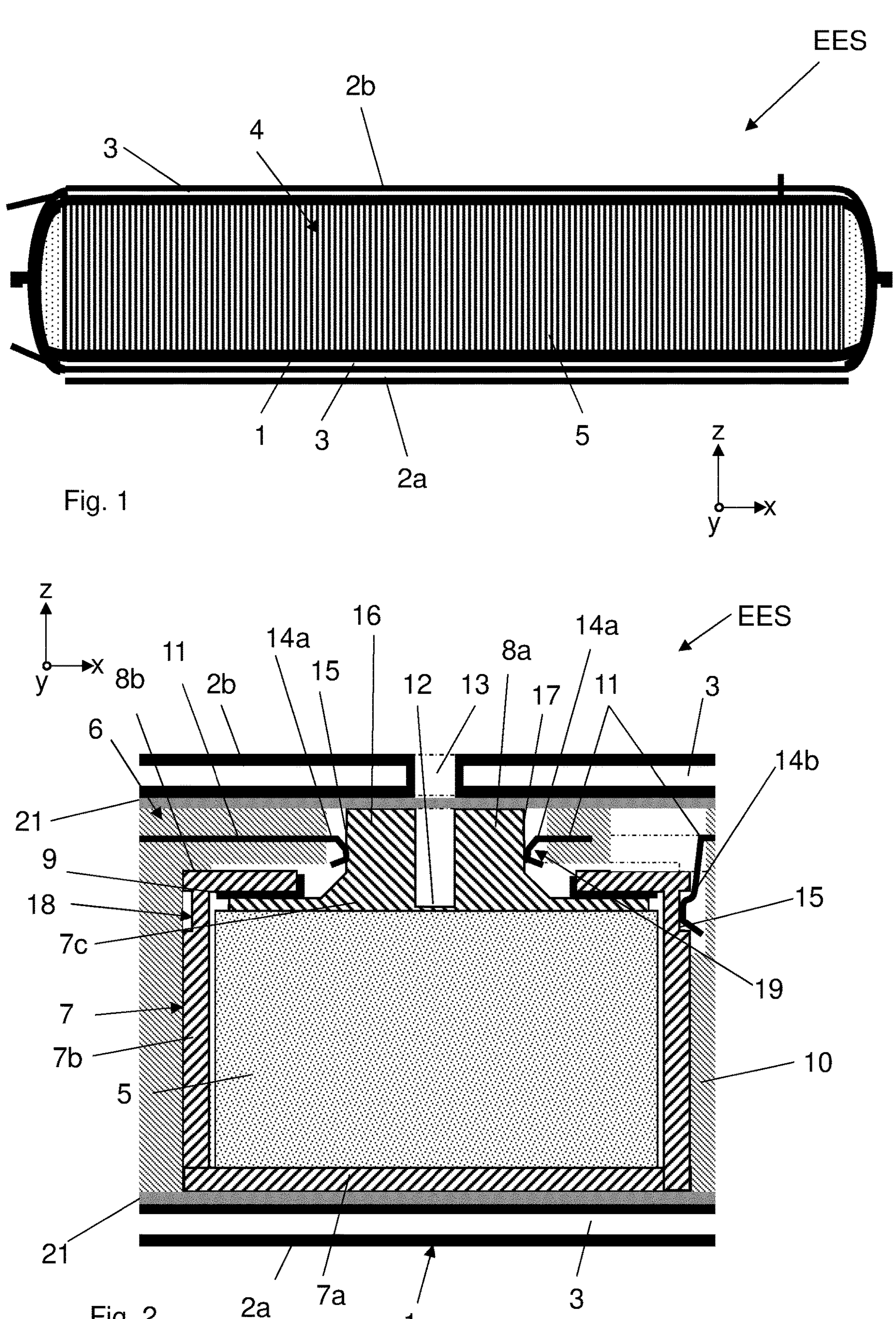
FIG. 1 shows a schematic illustration of an electrical energy store.
FIG. 2 shows a schematic sectional illustration of a first embodiment of an electrical energy store.

FIG. 1 shows an electrical energy store EES, which has a store housing 1 with a first housing part 2*a* in the form of a housing lower part and a second housing part 2*b* in the form of a housing upper part. The electrical energy store EES may for example be used as traction battery for an electrically operable motor vehicle and be in the form of a high-voltage energy store. The housing lower part 2*a* and the housing upper part 2*b* may have a double-walled form and may each contain a cooling channel 3 for a flowing cooling fluid. The cooling channels 3 may be connected to an external cooling circuit via connections. A cell assembly 4 of a plurality of energy storage cells 5 is disposed in the store housing 1 between the housing lower part 2*a* and the housing upper part 2*b*. The electrical energy store EES moreover has a cell contact-connection system 6 for contact-connection of the energy storage cells 5.

Figure 3:
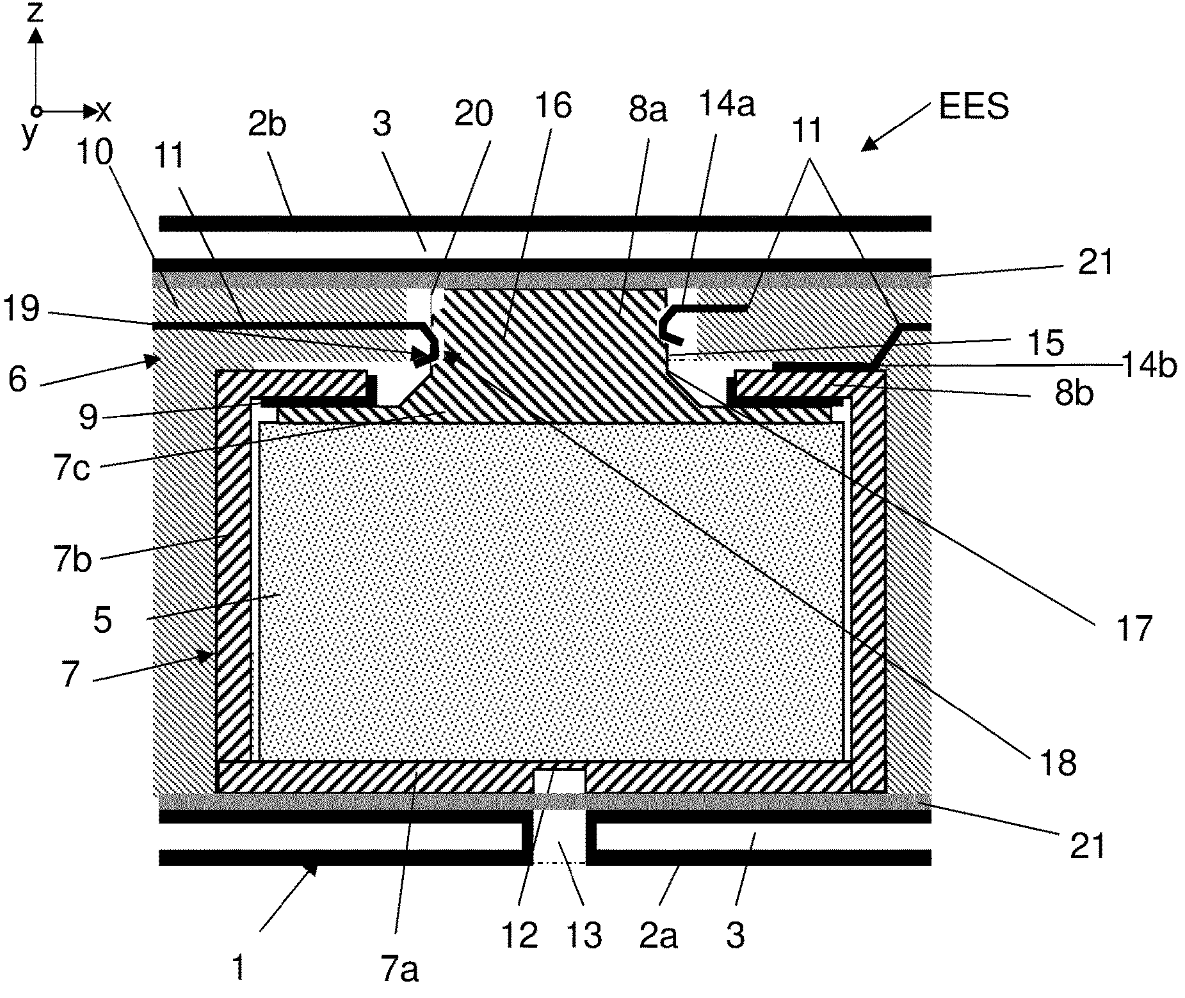
FIG. 3 shows a schematic sectional illustration of a second embodiment of an electrical energy store.
Figure 4:
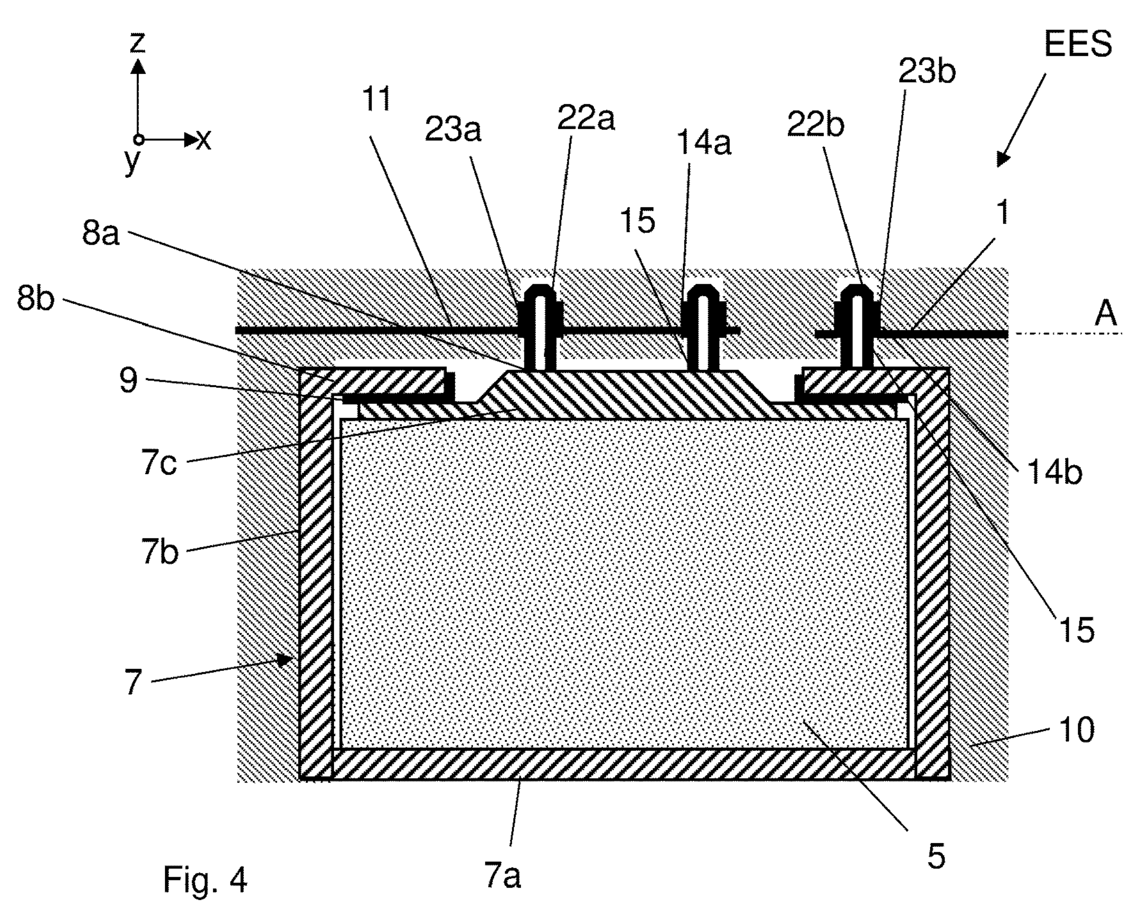
FIG. 4 shows a schematic sectional illustration of a third embodiment of an electrical energy store in a first plane.

As shown in FIG. 2, FIG. 3 and FIG. 4, the energy storage cells 5 have a cell housing 7 with a cell housing bottom 7*a*, a cell housing side wall 7*b* and a cell housing cover 7*c*. The energy storage cells 5 are in the form of round cells here, with the result that the cell housing 7 is cylindrical. The energy storage cells 5 have cell terminals 8*a*, 8*b*. Here, a first cell terminal 8*a* is formed on the cell housing cover 7*c* and a second cell terminal 8*b* is disposed on the cell housing side wall 7*b*. The cell housing side wall 7*b* here overlaps the cell housing cover 7*c* in certain regions, but is electrically insulated from the cell housing cover 7*c* by an insulating layer 9.

The cell contact-connection system 6 has a support 10, which bears conductor tracks 11 for interconnecting the energy storage cells 5. Moreover, the support 10 forms a frame for holding the energy storage cells. To this end, receptacles for the energy storage cells 5 may be provided in the frame, it being possible for the receptacles to be in the form of cylindrical cavities in the case of round cells. The cell housings 7 may be fixed, or adhesively bonded, to the frame and housing upper part 2*b* and have degassing openings 12. According to FIG. 2, the degassing openings 12 are formed in the cell housing covers 7*c*. According to FIG. 3, the degassing openings 12 are formed in the cell housing bottoms 7*a*. The associated housing part 2*a*, 2*b* has openings or rupture elements 13 assigned to the degassing openings 12.

The conductor tracks 11 have conductor track portions which form contact regions 14*a*, 14*b* for the cell terminals 8*a*, 8*b*. These contact regions 14*a*, 14*b* extend at least partially laterally and thus lie in an x-y plane. The cell terminals 8*a*, 8*b* at least partially have terminal regions 15 that are to be contact-connected laterally and extend in the vertical direction (along the z direction). The contact regions 14*a*, 14*b* form pressure contacts which are contact-connected to the lateral terminal regions 15 by exerting a laterally directed force. Only according to FIG. 3 do the second contact region 14*b* and the second cell terminal 8*b* have a flat form, with the result that the second contact region 14*b* exerts a vertically directed force on the second cell terminal 8*b*. Here, the second contact region 14*b* and the second cell terminal 8*b* may for example be metallurgically bonded.

According to FIG. 2 and FIG. 3, the cell housing cover 7*c* moreover has an upwardly protruding bulge 16, wherein the terminal region 15 of the first cell terminal 8*a* is formed by a side surface 17 of the bulge 16. The cell housing 7 may moreover have notches 18, which form the terminal regions 15 that are to be contact-connected laterally and in which the contact regions 14*a*, 14*b* are disposed. According to FIG. 2, the cell housing side wall 7*b* has the notch 18, and according to FIG. 3 the bulge 16 has the notch 18. The contact regions 14*a*, 14*b* have a fold 19 which is in the form of a turned-up portion and forms the spring-contact-like pressure contact. The side surface 17 of the bulge 16 may moreover have a thread 20 for fixing the energy storage cells 5 to the support 10. The lateral contact-connection of the cell terminals 8*a*, 8*b* makes it possible to dispose the housing parts 2*a*, 2*b* on both sides of the cell housings 7. Since both the housing parts 2*a*, 2*b* and the cell housings 7 can be made of metal, the housing parts 2*a*, 2*b* on an inner side have an insulating layer 21. The energy storage cells 5 can thus be cooled on both sides by way of the cooling channels 3 of the housing parts 2*a*, 2*b*.

Figure 5:
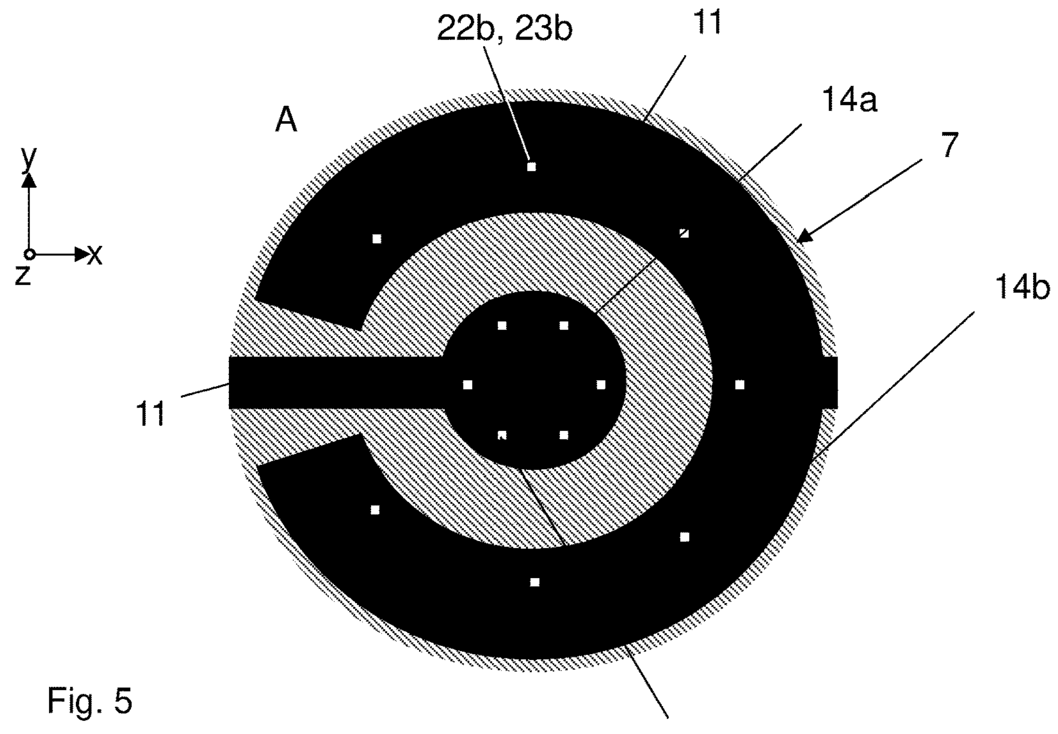
FIG. 5 shows a schematic sectional illustration of the third embodiment of the electrical energy store in a second plane.

In the embodiment of the electrical energy store EES according to FIG. 4, the terminal regions 15 of the first cell terminal 8*a* that are to be contact-connected laterally are in the form of first press-in pins 22*a*, which extend in the vertical direction z. The terminal regions 15 of the second cell terminal 8*b* that are to be contact-connected laterally are in the form of second press-in pins 22*b*, which extend in the vertical direction z. The contact regions 14*a*, 14*b* are in the form of contact holes 23*a*, 23*b*, in which the press-in pins 22 are pressed. In the process, as shown in the sectional illustration according to FIG. 5, which shows a section along the sectional line A, multiple first press-in pins 22*a* are connected to the cell housing cover 7*c* and multiple second press-in pins 22*b* are connected to the cell housing side wall 7*b* and the associated contact regions 14*a*, 14*b* have multiple contact holes 23*a*, 23*b*.

The invention claimed is:

1. An electrical energy store comprising:

a plurality of energy storage cells, each having a cell housing and two cell terminals; and a cell contact-connection system for interconnecting the energy storage cells, wherein:

the cell contact-connection system has a support and conductor tracks that are connected to the support and have conductor track portions, which form contact regions for contact-connection to the cell terminals of the energy storage cells, the cell terminals at least partially have terminal regions that are to be contact-connected laterally, and the contact regions are at least partially in a form of lateral pressure contacts, which in a course of contact-connection exert a lateral force on the terminal regions that are to be contact-connected laterally, and a first cell terminal is disposed on a cell housing cover of the cell housing of the energy storage cells and a second cell terminal is disposed on a cell housing side wall of the cell housing.

2. The electrical energy store according to claim 1, wherein the energy storage cells are in a form of round cells.

3. The electrical energy store according to claim 1, wherein the cell housing has at least one notch, in which an associated contact region of the conductor tracks is disposed and which form the terminal region of the respective cell terminal that is to be contact-connected laterally.

4. The electrical energy store according to claim 1, wherein the cell housing cover has an upwardly protruding bulge, and a side surface of the bulge forms the terminal region of the respective cell terminal that is to be contact-connected laterally.

5. The electrical energy store according to claim 4, wherein the side surface of the bulge has a thread, and the support has a mating thread corresponding to the thread for fixing the energy storage cells to the support.

6. The electrical energy store according to claim 1, wherein the contact regions have a fold, which is in a form of a turned-up portion and is formed by folding over an edge region of the conductor track portions, and the fold is pressed laterally against a terminal region of the respective cell terminal that is to be contact-connected laterally.

7. The electrical energy store according to claim 1, wherein:

the terminal region of the first cell terminal that is to be contact-connected laterally is in a form of at least one first upwardly protruding press-in pin which is connected to the cell housing cover, the terminal region of the second cell terminal that is to be contact-connected laterally is in a form of at least one second upwardly protruding press-in pin which is connected to the cell housing side wall, the associated contact regions are in a form of contact holes in the conductor tracks, and the press-in pins are pressed in the contact holes.

8. The electrical energy store according to claim 1, further comprising:

a store housing with a housing upper part and a housing lower part, wherein:

the housing upper part and the housing lower part have a double-walled form to form a respective cooling channel, and to cool the energy storage cells, the housing upper part is disposed on cell housing covers of the cell housings and the housing lower part is disposed on cell housing bottoms of the cell housings.

9. A motor vehicle comprising the electrical energy store according to claim 1.

* * * * *